US011203163B2

(12) United States Patent
Saelens et al.

(10) Patent No.: US 11,203,163 B2
(45) Date of Patent: Dec. 21, 2021

(54) APPARATUS AND METHOD FOR PRODUCING A SEALED CONNECTION

(71) Applicant: SCALDOPACK SA, Dottignies (BE)

(72) Inventors: Harald Saelens, Marke (BE); Henno Hensen, Bremen (DE)

(73) Assignee: Scaldopack SA, Dottignies (BE)

(*) Notice: Subject to any disclaimer, the term of this patent is extended or adjusted under 35 U.S.C. 154(b) by 78 days.

(21) Appl. No.: 16/489,740

(22) PCT Filed: Jan. 31, 2018

(86) PCT No.: PCT/EP2018/052414
§ 371 (c)(1),
(2) Date: Aug. 29, 2019

(87) PCT Pub. No.: WO2018/158025
PCT Pub. Date: Sep. 7, 2018

(65) Prior Publication Data
US 2020/0230889 A1 Jul. 23, 2020

(30) Foreign Application Priority Data

Mar. 2, 2017 (DE) .................. 10 2017 104 413.2

(51) Int. Cl.
B29C 65/08 (2006.01)
B29C 65/00 (2006.01)
B29L 31/00 (2006.01)

(52) U.S. Cl.
CPC ........ *B29C 65/08* (2013.01); *B29C 66/00461* (2013.01); *B29C 66/00463* (2013.01);
(Continued)

(58) Field of Classification Search
CPC ... B29C 65/08; B29C 65/18; B29C 66/00461; B29C 66/00463; B29C 66/53263;
(Continued)

(56) References Cited

U.S. PATENT DOCUMENTS 1,742,473 A * 1/1930 Holz ............... B29C 33/202
425/95
2,663,350 A * 12/1953 Dettmer ............ B29C 65/7891
156/389

(Continued)

FOREIGN PATENT DOCUMENTS

EP 1744957 B1 5/2009
GB 839264 A 6/1960

OTHER PUBLICATIONS

International Search Report dated Apr. 20, 2018 filed in PCT/EP2018/052414.

*Primary Examiner* — Philip C Tucker
*Assistant Examiner* — Brian R Slawski
(74) *Attorney, Agent, or Firm* — Rankin, Hill & Clark LLP

(57) ABSTRACT

The invention relates to a device for making a sealing connection between two material layers containing plastic, especially in a product packing pouch (2), having at least one sealing station (3), comprising at least two sealing jaws (4a, 4b) situated opposite each other and movable between an open position and a sealing position, having respectively a sealing surface (5a, 5b) on their inner side facing toward the other respective sealing jaw (4b, 4a), wherein the sealing station (3) is configured such that in the open position at least two material layers (6, 7, 8) to be joined together by sealing can be arranged between the sealing jaws (4a, 4b) and in the sealing position the material layers (6, 7, 8) can be pressed together. It is proposed that at least one of the sealing jaws (4a, 4b) comprises at least one lubricant channel (9) and the device (1) comprises a lubricant delivery device (10), which is configured to direct a lubricant through the lubricant channel (9) toward the sealing surface (5a, 5b)

(Continued)

Figure 1:
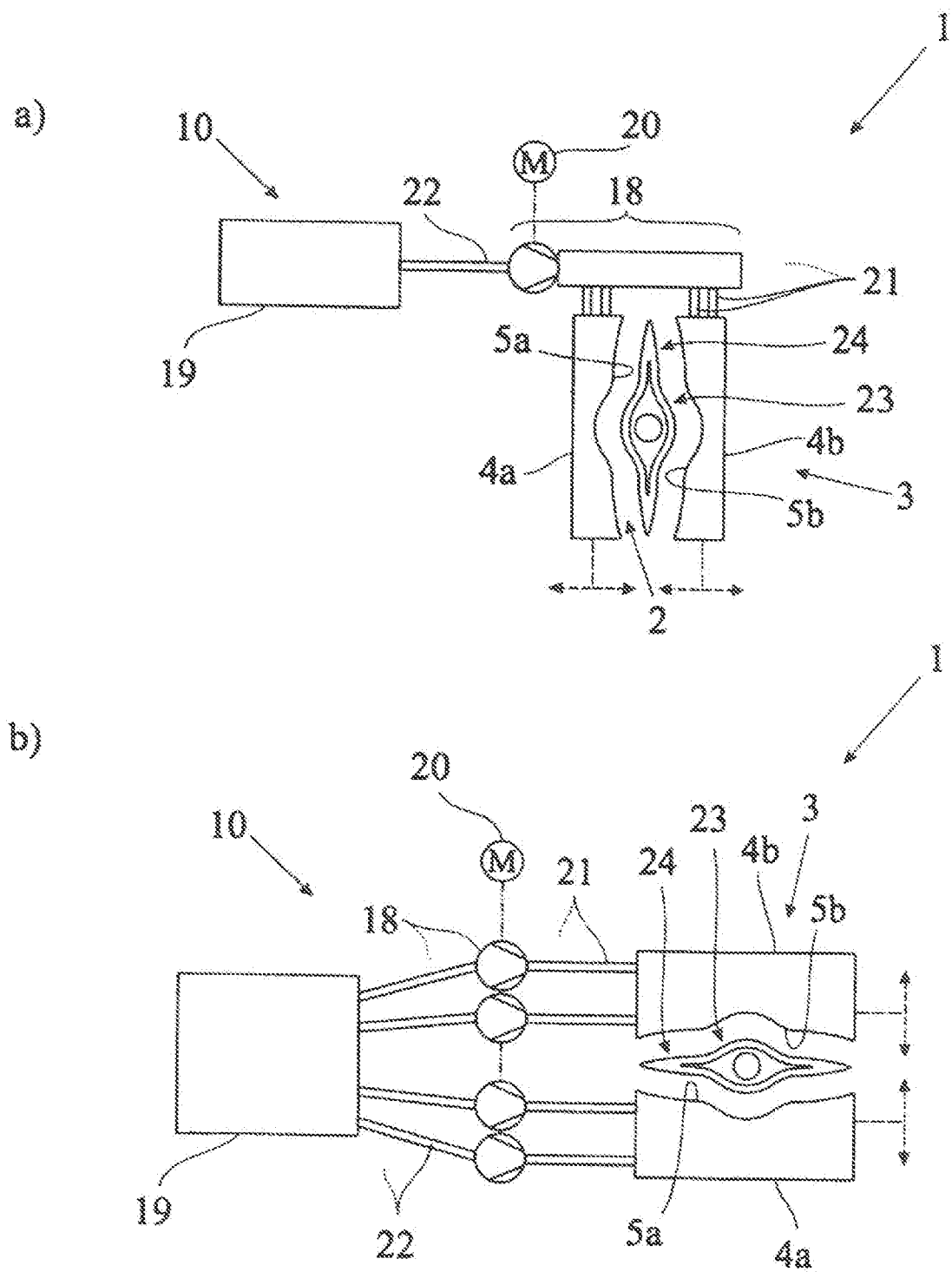

of the sealing jaw (4*a*, 4*b*) and/or toward the sealing surface (5*b*, 5*a*) of the oppositely situated sealing jaw (4*b*, 4*a*).

14 Claims, 5 Drawing Sheets

(52) U.S. Cl.
CPC ........ *B29C 66/53263* (2013.01); *B29C 66/71* (2013.01); *B29C 66/723* (2013.01); *B29C 66/81423* (2013.01); *B29C 66/0062* (2013.01); *B29C 66/73921* (2013.01); *B29C 66/83221* (2013.01); *B29C 66/8491* (2013.01); *B29L 2031/712* (2013.01)

(58) Field of Classification Search
CPC . B29C 66/71; B29C 66/723; B29C 66/81423; B29C 66/73921; B29C 66/83221; B29C 66/1121; B29C 66/0046; B29C 66/0062; B29C 66/849; B29C 66/8491; B29C 66/951; B29C 66/8511; B29C 66/851; B29L 2031/712

USPC ...... 156/60, 182, 228, 278, 289, 292, 308.2, 156/308.4, 309.6, 349, 390, 580, 583.1; 53/451; 425/90, 107, 542, 588
See application file for complete search history.

(56) References Cited

U.S. PATENT DOCUMENTS

| | | | | |
|---|---|---|---|---|
| 3,340,795 A | * | 9/1967 | Hartley | ............... B30B 5/00 |
| | | | | 100/154 |
| 3,687,789 A | | 8/1972 | Wheeler | |
| 4,080,243 A | * | 3/1978 | Pohl | .................. B27D 3/02 |
| | | | | 100/269.03 |
| 6,533,890 B1 | * | 3/2003 | Berger | ................ B27N 3/086 |
| | | | | 156/296 |
| 7,640,717 B2 | | 1/2010 | Shokri et al. | |
| 8,360,300 B1 | | 9/2013 | Strotmann et al. | |
| 2001/0005603 A1 | * | 6/2001 | Kubota | ............... B32B 37/10 |
| | | | | 438/126 |
| 2004/0244338 A1 | * | 12/2004 | Nievergeld | .......... B29C 65/305 |
| | | | | 53/451 |

* cited by examiner

APPARATUS AND METHOD FOR PRODUCING A SEALED CONNECTION

The present invention relates to a device for making a sealing connection between two material layers containing plastic, especially in a product packing pouch, having at least one sealing station, comprising at least two sealing jaws situated opposite each other and movable between an open position and a sealing position, having respectively a sealing surface on their inner side facing toward the other respective sealing jaw, wherein the sealing station is configured such that in the open position at least two material layers to be joined together by sealing can be arranged and in the sealing position the material layers can be pressed together. Moreover, the invention relates to a method for making a sealing connection between two material layers containing plastic, especially in a product packing pouch.

From the prior art it is known, for example, how to seal spouts into prefabricated pouches. The pouches are generally product packing pouches, designed for example as stand-up pouches. The pouches are fully formed except for a last sealed seam, which is not yet produced, and they have an opening in the head area for inserting a spout.

The spout, which is joined by sealing to the edge of the opening, usually has a boat-shaped lower portion according to the prior art, i.e., a portion with two wings extending away from each other. This boat-like lower portion is then inserted into the not yet sealed opening of the pouch and taken together with the pouch to a sealing station, which uses for example permanently heated sealing jaws, so-called hot sealing jaws, to weld the material layers forming the front and rear wall of the pouch to the lower spout portion, i.e., joining them in an integral bonding.

The two material layers of the pouch in the prior art usually consist of multiple layers, the outer layer generally consisting of PET (polyethylene terephthalate) and the inner layer consisting of PE (polyethylene) or PP (polypropylene). The spout often consists of the same material as the inner layer of the material layers of the pouch, i.e., likewise of PE or PP.

One peculiarity in the aforementioned material formation is the different melting points of the individual materials within the layer formation. The respective inner layer of the material layers and the spout material have a relatively low melting point (PE: around 110-135° C.; PP: around 160-165° C., source: http://www.chemie.de/lexikon), whereas the outer layer of the material layers has a significantly higher melting point (PET: >260° C., source http://www-.chemie.de/lexikon). This means that the interior layers of the material layers (such as PE, PP) coming into contact with each other melt or liquefy during the sealing process and the exterior layers (such as PET) continue to remain shape-stable. This welding process is carried out with permanently heated sealing jaws, while the sealing parameters of pressure, temperature and time need to be set precisely. Thus, too high a temperature results in scorching of the film and loosening of the integral bonding within the layer formation of the particular material layer. Too high a pressure squeezes an excessive amount of the liquefied PE or PP from the joint connecting the material layers. And too long lasting or too often repeated a sealing process at multiple sealing stations is not economical. Now, in order to achieve the best possible performance for the lowest possible costs, it is therefore desired to work with the fewest possible sealing stations and to keep the length of the sealing process as short as possible. For this reason, however, one will work with the sealing parameters of pressure and temperature at their upper limit, which necessarily results in a squeezing out of sealing material. This effect is especially strong with PE as sealing material, owing to the relatively low melting point.

One problem is that PE or PP squeezed out during the sealing process settles onto the sealing jaws and the surroundings as well as onto the product that has been sealed, such as a product packing pouch, and thus results in unwanted contamination. In order to avoid contamination of at least the sealing jaws, it is known in the prior art how to feed a Teflon band from an endless roll and to arrange it between the respective sealing jaw and the material layers to be pressed together, and after several sealing processes the Teflon band is partly transported onward, so that during the next sealing process a portion of the Teflon band which is free of contamination due to squeezed-out PE or PP is again arranged between the sealing jaws and the material layers. But a method for making a sealing connection, especially for a product packing pouch, in which a Teflon band is used to avoid contamination is relatively laborious and cost intensive. Furthermore, despite the providing of a Teflon band, the sealing jaws and their surroundings also need to be regularly cleaned of PE or PP droplets, which results in down times and thereby lowers the performance. Moreover, the sealing jaws may also become damaged by sharp brushes or metal during the cleaning.

The problem which the invention proposes to solve is to indicate a device and a method for making a sealing connection with which the cleaning expense and thus the down times can be reduced.

The previously derived and defined problem is solved according to a first teaching of the present invention in a device for making a sealing connection between two material layers containing plastic, especially in a product packing pouch, such as a stand-up pouch, having at least one sealing station, comprising at least two sealing jaws situated opposite each other and movable between an open position and a sealing position, having respectively a sealing surface on their inner side facing toward the other respective sealing jaw, wherein the sealing station is configured such that in the open position at least two material layers to be joined together by sealing can be arranged between the sealing jaws and in the sealing position the material layers can be pressed together, in that at least one of the sealing jaws comprises at least one lubricant channel and the device comprises a lubricant delivery device, which is configured to direct a lubricant through the lubricant channel toward the sealing surface of the sealing jaw or toward the sealing surface of the oppositely situated sealing jaw.

Basically, the proposed device and the yet to be described proposed method can be used for any sealing connection between two material layers containing plastic as the sealing partners. Thus, to name only a few examples, the sealing partner or partners may be a film, especially a film for flexible pouches, a carton, especially a beverage carton, a cup, especially a yoghurt cup, or a lid, especially a cup lid.

The sealing station can be both a hot sealing station and an ultrasound sealing station. The proposed device for making a sealing connection and the corresponding method yet to be described will find application in particular in the sealing of horizontal or vertical pouches (flowpack sealing), in the sealing of pouches, especially product packing pouches, preferably stand-up pouches (pouch sealing), in spout sealing, in tray sealing, or cup sealing, in the sealing of milk cartons (carton-brick sealing) and in the sealing of pouches in FFS (form fill seal) machines, which form, fill and seal the pouch in the very same machine. In particular, the device may be part of a pouch production (pouch converting) machine, which seals the respective spout in prefabricated pouches, especially those produced by the machine itself.

A major discovery is that, by delivering a lubricant to the sealing surface(s) or into the region between the sealing surface and the outside of the respective material layer an adherence of squeezed-out sealing material, especially PE or PP, is avoided or at least is significantly deterred. The lubricant is taken through a lubricant channel formed by the material of one of the sealing jaws. By a lubricant channel is meant in particular a channel entirely surrounded by material, especially a borehole, while it is also basically conceivable for the channel or a portion thereof to run along the surface of the sealing jaw and to form a groove. The lubricant is directed from the lubricant channel either onto the sealing surface of the same sealing jaw and/or onto the sealing surface of the oppositely situated sealing jaw.

The lubricant is in particular a liquid lubricant, such as water, a water-based or non-water-based liquid, a liquid containing paraffin, a liquid containing Teflon, a liquid containing fat or oil and/or a liquid containing silicone. In addition or alternatively, a gaseous lubricant may also be provided as the lubricant, such as air, while a gaseous lubricant is also understood as being a spray mist created from a liquid lubricant, which can be sprayed from the respective sealing jaw and/or onto the respectively oppositely situated sealing jaw and is precipitated onto the sealing jaw. Basically, in addition or alternatively, a solid lubricant may also be provided as the lubricant, which may be present in the solid form and/or powder form. The lubricant in particular has a kinematic viscosity in a range of 100 to 500 cSt, preferably in a range of 150 to 450 cSt, especially preferably in a range of 200 to 400 cSt. Preferably, the lubricant is food grade, so that this can also be used in the making of food packages, such as stand-up pouches for beverages, milk cartons, or the like.

The presence of a lubricant delivery device with which a lubricant can be applied as described above to the respective sealing surface thus enables, by pressing together under elevated pressure and elevated temperature, a sealing connection, i.e., an integrally bonded connection, to be produced between material layers containing plastic at their contact sides. By material layers is meant prefabricated elements consisting of already integrally bonded layers in the case of a multilayered formation. The material layers thus form single-piece elements already before the sealing process.

According to one embodiment of the proposed device, the at least one lubricant channel extends through the material of the respective sealing jaw, i.e., is entirely enclosed at the circumference, the channel extending in particular from a rear side of the sealing jaw facing away from the front side to the sealing surface. Basically, however, the channel may also extend from a side running at an angle to the front side and/or bordering on the front side to the sealing surface.

According to yet another embodiment of the proposed device, the respective lubricant channel extends from an entry opening to one or more exit openings in the sealing surface. The respective lubricant channel may branch one or more times between the entry opening and the exit opening or the exit openings. In other words, the lubricant enters the sealing jaw at one side, such as the rear side, of the sealing jaw and exits at multiple exit openings, which terminate in the plane of the sealing surface. Basically, each of the sealing jaws may comprise multiple lubricant channels, and each of these lubricant channels may also branch one or more times.

According to yet another embodiment of the proposed device, one or more exit openings, especially all exit openings, have a smaller cross section area than the entry opening of the lubricant channel which leads to the respective exit opening(s). In other words, the cross section of the lubricant channel narrows between the entry opening and the associated exit opening or openings, especially by a multiple, especially such that the exit openings form so-called micro-openings or micro-nozzles. The cross section area of one or more exit openings, especially all exit openings, is less than 5 mm$^2$, preferably less than 2 mm$^2$, especially preferably less than 1 mm$^2$.

According to yet another embodiment of the proposed device, the respective sealing surface (in the intended installed state of the sealing jaw) comprises an upper sealing surface edge and a lower sealing surface edge spaced apart from the upper edge in the direction of gravity, wherein one or more exit openings, especially all exit openings, are further spaced apart from the lower sealing surface edge than from the upper sealing surface edge. Such an arrangement of the exit openings guarantees that leaking lubricant flows down due to the force of gravity on the sealing surface and thus results in a better distribution on the sealing surface. A further benefit is that the holes in the sealing surface therefore lie above the region or in the upper part of the region of the later sealed seam and thus have no noticeable influence on the seal quality on the product.

According to yet another embodiment of the proposed device, the distance along the surface of the sealing surface between neighbouring exit openings lies in a range of 5 to 60 mm, preferably in a range of 10 to 50 mm, especially preferably in a range of 20 to 40 mm. On the one hand, these distances are sufficient to wet the respective sealing surface optimally with lubricant, on the other hand the holes in the sealing surface also do not adversely affect the sealing process.

In order to deliver the lubricant to the sealing station or to the sealing jaw or jaws, according to yet another embodiment of the proposed device, the lubricant delivery device comprises at least one lubricant pump and one lubricant reservoir, which stands in fluidic connection with the at least one lubricant pump, i.e., it is connected via a fluid line. The lubricant pump or pumps are each in particular a peristaltic pump, i.e., in particular, a pump acting on a hose by elements such as rollers revolving inside it, whereby the lubricant is transported, with the revolving elements moving the lubricant forward in the direction of the pump outlet by squeezing together the hose.

In particular, the lubricant delivery device may comprise multiple lubricant pumps, such as peristaltic pumps, which are then driven by a common motor and in particular by a common shaft. In this case, multiple delivery lines may extend from the reservoir to the pump unit with the multiple pumps, and then in the further course a separate connection line also extends from each pump to the sealing station. In the sealing station then, as has already been explained, one connection line may be connected to each sealing jaw or multiple connection lines can be connected to the sealing jaw. In the event that only a single lubricant pump is provided, only one delivery line will extend in particular from the lubricant reservoir to the individual pump, while in the further course one or more connection lines may lead from the pump to the sealing station, in order to form there a fluidic connection with the sealing jaw or jaws.

The delivery and/or connection line(s) is/are flexible in particular, being preferably plastic lines.

According to yet another embodiment of the proposed device, the sealing jaws, as already indicated above, are hot sealing jaws in particular. Basically, however, ultrasound sealing jaws can also be provided in addition or alternatively.

The problem is moreover solved according to a second teaching by a method for making a sealing connection between two material layers containing plastic, especially in a product packing pouch, such as a stand-up pouch, preferably by using a device as defined above, wherein the following steps are carried out:

a) moving of at least two oppositely situated sealing jaws of a sealing station into an open position, wherein the sealing jaws respectively comprise a sealing surface and wherein the sealing surfaces are facing toward each other,
b) delivery of a lubricant through at least one lubricant channel of the respective sealing jaw to the sealing surface of the sealing jaw or to the sealing surface of the oppositely situated sealing jaw,
c) arranging of at least two material layers between the sealing surfaces of the sealing jaws,
d) moving of the at least two sealing jaws toward each other into a sealing position, in which the material layers are pressed together by the sealing surfaces, i.e., joined together by sealing.

The abovementioned method steps are carried out in particular in the previously indicated sequence, but may also basically be carried out in a different sequence. For example, the arranging of the at least two material layers between the sealing surfaces may also be carried out prior to the delivery of the lubricant.

After performing the abovementioned steps a) to d), a new sealing process may occur automatically, once again starting with step a) and carrying out the same steps as in the previous sealing process.

Preferably, the aforementioned steps of the method are carried out automatically, in particular under the control of a control device of the proposed device. The control device, which can be operated with corresponding software, may also carry out an automatic shut-off mode (power down mode), for example in the event of a loss of current or voltage. In addition or alternatively, the control device may also carry out a sleep mode, for example in the event that no sealing processes are occurring in a particular period of time. The control unit may also communicate with an operator unit, which may comprise a keyboard, and/or a display unit, which may comprise a monitor.

According to one embodiment of the proposed method, in a spatial portion between the sealing surfaces of the two (oppositely situated) sealing jaws at least three material layers are pressed together, especially precisely three material layers, namely in particular two film portions and a spout arranged in between them. In addition or alternatively, in a spatial portion between the sealing surfaces, which is in particular a different spatial portion, at least two material layers are pressed together, especially precisely two material layers, namely in particular two film portions. The pressing together under increased pressure (as compared to atmospheric pressure) and increased temperature (as compared to room temperature) then produces a sealed seam joining the pressed-together portions by an integral bonding.

When sealing a spout between a front pouch wall formed by a first material layer and a rear pouch wall formed by a second material layer, three material layers are pressed together in the region of the spout or joined together by sealing, namely, the upper portions of the two pouch walls, hereinafter also called the film portions, and the lower (especially boat-shaped) portion of the spout, serving for the sealing. Thus, a product portion is pressed together with a three-layered material formation. On both sides of this product portion there is another adjoining product portion in which two material layers are pressed together, namely, only the two pouch walls or film portions. According to a corresponding embodiment of the proposed method, two film portions, especially multilayered film portions, are thus pressed together as the material layers and/or a spout, especially a boat-shaped spout, is pressed together on both sides with one film portion each, especially multilayered film portion, as the material layers.

"Multilayered" means that the respective film portions or material layers have for example a two-layered or multilayered formation. In the case of a two-layered formation, for example, the outside layer may consist of PET and the inside layer of PE or PP. In a three-layered formation, for example, the outside layer may consist of PET, the middle layer of metal, especially aluminium, and the inside layer of PE or PP. In a more complex film formation, which is used especially for pouches which are subjected to a heat treatment in an autoclave, the outside layer may consist of PET, a middle layer of PA (polyamide) and the inside layer likewise of PE or PP. Basically, yet other adhesive layers and/or colouring layers may also be provided between the individual layers. Accordingly, in yet another embodiment of the proposed method, the (outside) layer facing the respective sealing surface of the material layers, especially the film portions, may consist of PET and the mutually contacting (inside) layers of the material layers, especially the film portions and possibly the spout, may consist of PE or PP. Basically, however, it is not absolutely necessary to provide multilayered material layers as the sealing partners for the use of the proposed device or the proposed method, but rather so-called monomaterials are also feasible, i.e., sealing partners with only one layer, as is especially the case with spouts. Thus, films consisting exclusively of PE or PP are also feasible as sealing partners.

Figure 2:
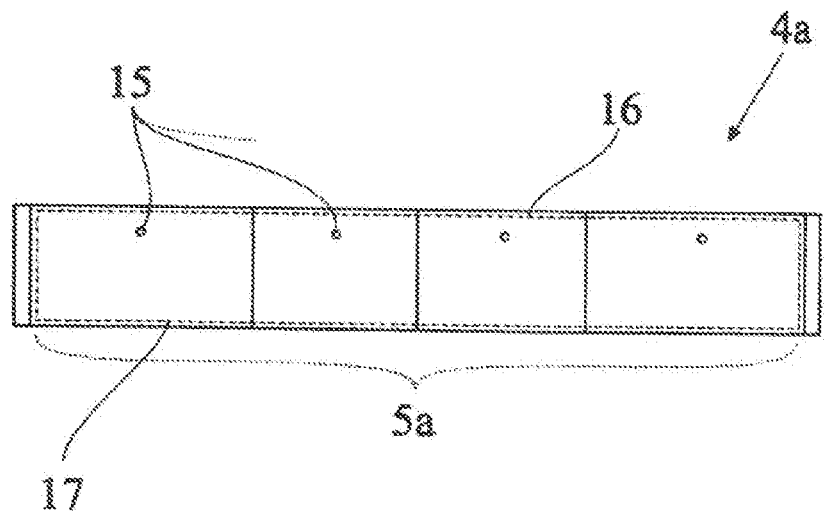
Figure 3:
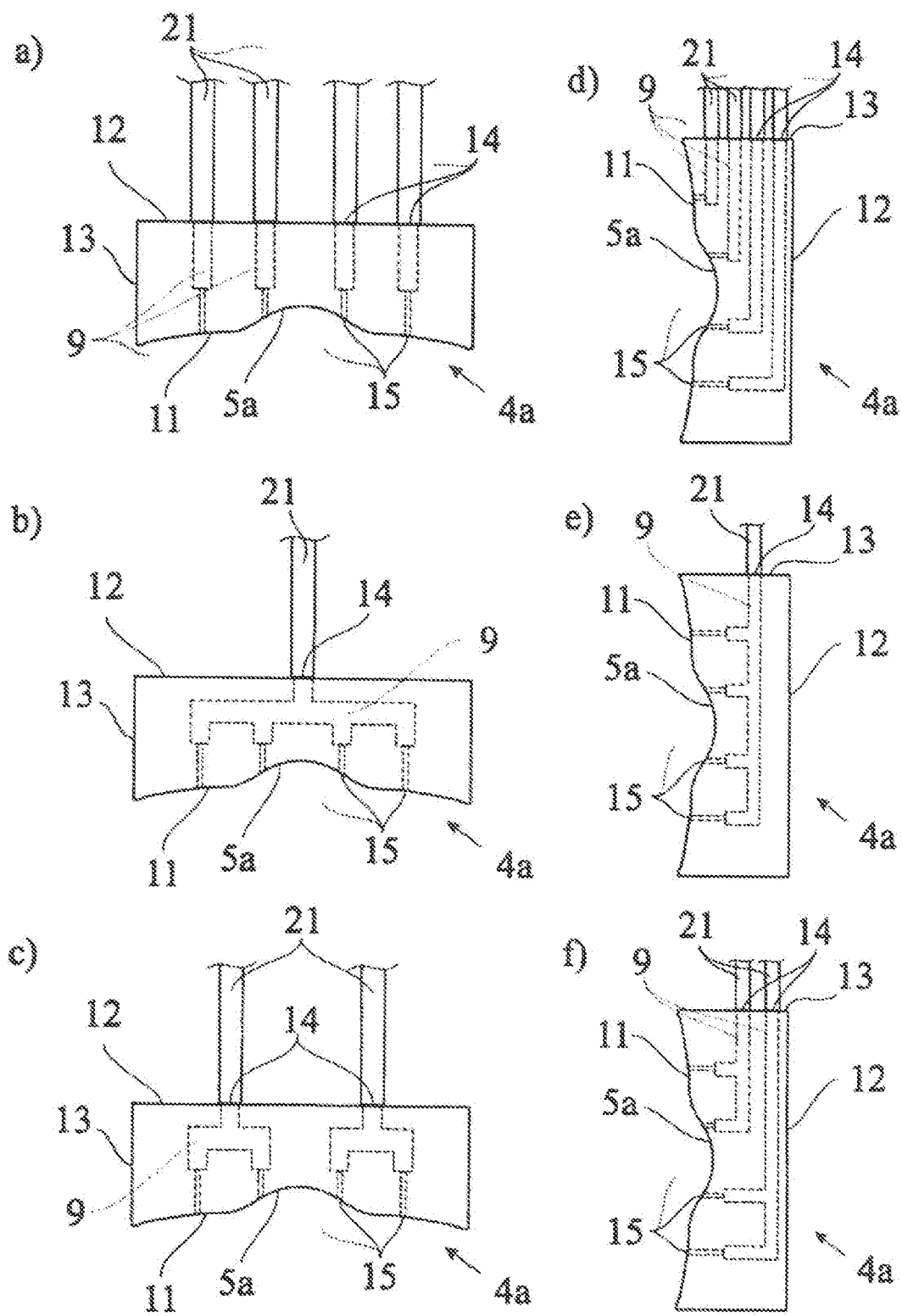
Figure 4:
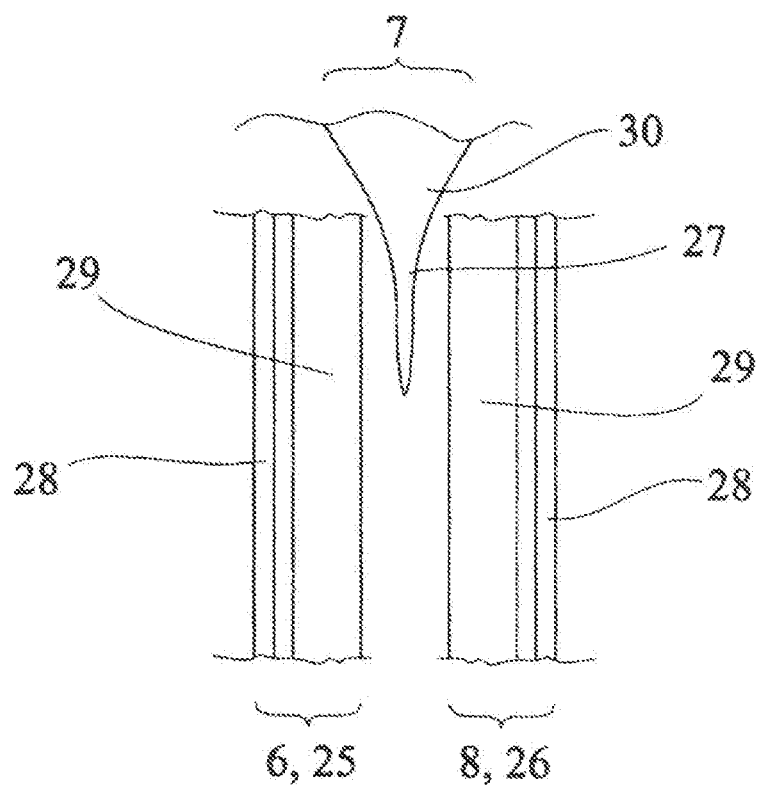
Figure 5:
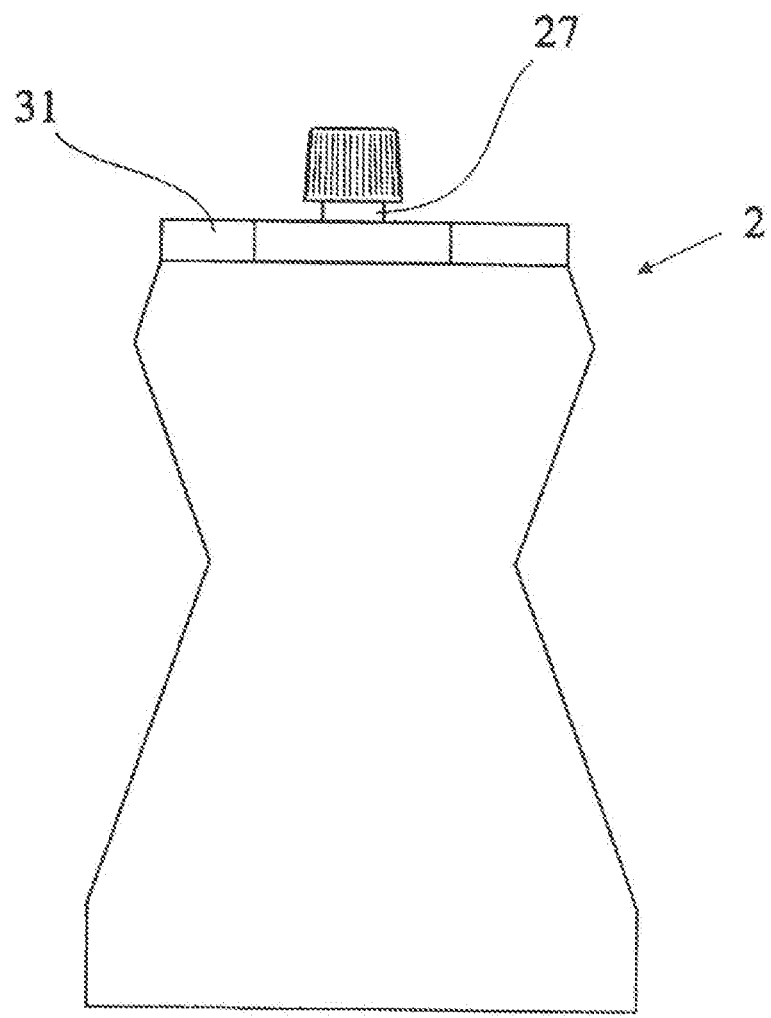

Now, there are many possibilities of configuring and modifying the proposed device and the proposed method. In this regard, refer on the one hand to the dependent patent claims referring back to claims 1 and 15 and on the other hand to the description of exemplary embodiments in connection with the drawing. In the drawing:

FIGS. 1a and b show a schematic view of various exemplary embodiments of a proposed device for making a sealing connection, FIG. 2 shows a schematic view of a sealing jaw of the device in FIGS. 1a and b, FIG. 3a-f show a schematic view of different variants of sealing jaws of the device in FIGS. 1a and b, FIG. 4 shows a schematic view of material layers to be pressed together, and FIG. 5 shows a schematic view of a stand-up pouch which can be made with the devices in FIGS. 1a and b.

FIGS. 1a and b each show a device 1 for making a sealing connection, here for example in a product packing pouch 2 containing plastic in the form of a stand-up pouch, where the device 1 comprises a sealing station 3 and a lubricant delivery device 10.

In both exemplary embodiments, the sealing station 3 comprises two sealing jaws 4a, 4b situated opposite each other and movable between an open position and a sealing position, having respectively a sealing surface 5a or 5b on their inner side facing toward the other respective sealing jaw 4b or 4a. The sealing jaws 4a, 4b have a form adapted to the spout 27 which is to be sealed, making it possible to join by sealing and integral bonding the film portion 25 of the front pouch wall and the film portion 26 of the rear pouch wall along the entire width of the spout 27, which is formed here in boat shape. The sealing is done in a first, middle spatial portion 23 between the sealing surfaces 5a and 5b. On both sides of the spout 27, the two film portions 25 and 26 are joined directly together by the sealing process, which occurs respectively in an outer spatial portion 24 bordering respectively on the side of the middle spatial portion 23.

The sealing station 3 is configured such that in the open position the three material layers 6, 7, 8 or 25, 26, 27 to be joined together by sealing can be arranged between the sealing jaws 4a, 4b and especially between the two sealing surfaces 5a, 5b and in the sealing position these material layers can be pressed together, so that an integrally bonded connection is achieved by melting of the inside layers of the material layers 6 and 8 and the spout 27.

At least one of the sealing jaws 4a or 4b, in this instance both sealing jaws 4a, 4b, comprise one or more lubricant channels 9, by which a lubricant can be directed at the sealing surface 5a or 5b of the same sealing jaw 4a or 4b or at the sealing surface 5b or 5a of the oppositely situated sealing jaw 4b or 4a.

Different exemplary embodiments of sealing jaws 4a and 4b with lubricant channels 9 running through them are represented in FIG. 3a-f. Each time, only the sealing jaw 4a is shown, but what has been said also holds for the other sealing jaw 4b.

For example, multiple connection lines 21 may be connected respectively via an entry opening 14 to the sealing jaw 4a, and from each entry opening 14 there extends a nonbranched lubricant channel 9 to a respectively corresponding exit opening 15, which emerges in the respective sealing surface 5a (FIG. 3a). Basically, there may also be provided only a single connection line 21 for each sealing jaw 4a and a corresponding single entry opening 14, but then the lubricant channel 9 branches one or more times inside the sealing jaw 4a and leads to correspondingly many exit openings 15 lying within the respective sealing surface 5a (FIG. 3b). Accordingly, multiple connection lines 21 may also be connected to the corresponding sealing jaw 4a, and the then adjoining lubricant channel 9 will branch in each case one or more times and terminate in correspondingly many exit openings 15 (FIG. 3c). The exit openings 15 are all located at the front side 11 of the sealing jaw 4a facing toward the oppositely situated sealing jaw 4b and the entry opening 14 or entry openings 14 is/are located at the rear side 12 of the sealing jaw 4a (FIG. 3a-c) facing away from the front side 11 and/or side 13 of the sealing jaw 4a at a running at an angle to the front side 11 and/or bordering on the front side 11 (FIG. 3d-f).

As can likewise be seen from FIG. 3a-f, the exit openings 15 are micro-openings or micro-nozzles, i.e., openings with a cross section area which is less than 5 mm$^2$, preferably less than 2 mm$^2$, especially preferably less than 1 mm$^2$. In particular, the cross section of the exit openings 15 is always less than that of the associated entry opening 14.

In FIG. 2 one can see the front side 11 of a sealing jaw 4a, which may be identical in design to the sealing jaw 4b, and the corresponding sealing surface 5a. The sealing surface 5a here extends for example only across a partial region of the front side 11, but it may also easily occupy the entire front side 11. The exit openings 15 per FIG. 2 all lie in a row along the sealing surface 5a and 5b, being nearer to the upper sealing surface edge 16 than to the lower sealing surface edge 17, which is spaced away from it in the direction of gravity. The exit openings for example are spaced apart from each other by 5 to 60 mm, preferably 10 to 50 mm, especially preferably 20 to 40 mm.

The sealing jaws 4a and 4b, which in this case are hot sealing jaws for example, but which can also be ultrasound sealing jaws, press together a layer formation, such as is represented in FIG. 4, under elevated pressure and elevated temperature. The two outer material layers 6 and 8 or film portions 25 and 26 enclose a middle material layer 7 or 27, which is formed by the lower part of the spout 27. The material layers 6 and 8 are each multilayered in formation, the respective outer layer 28 here for example consisting of PET and the respective inner layers 29 consisting of PE or PP. The middle material layer 7 in the form of the lower part of the spout 27 consists of the same material as the inner layers 29 and the material or the outer layer 30 of the spout 27, i.e., likewise of PE or PP.

In the following, the lubricant delivery device 10 shall be described, which in the case of FIG. 1a differs from the exemplary embodiment represented in FIG. 1b in that a single lubricant pump 18 in the form of a peristaltic pump driven by a motor 20 is provided, which pumps the lubricant, such as a liquid or gaseous lubricant and/or a solid lubricant from a lubricant reservoir 19 and then distributes it to the sealing jaws 4a and 4b. According to FIG. 1a, a single delivery line 22 runs from the lubricant reservoir 19 to the pump 18, while multiple flexible connection lines 21 extend from the pump 18 to the two sealing jaws 4a and 4b.

According to the alternative exemplary embodiment in FIG. 1b, instead of only a single pump 18 there are provided multiple pumps 18, all of which are driven by a common motor 20 and a common drive shaft. Here as well, the pumps 18 are peristaltic pumps. Multiple delivery lines 22 run from the reservoir 19 to the unit formed of multiple pumps 18, there being provided here precisely one delivery line 22 for each pump 18. In the further course, precisely one connection line 21 here extends respectively from each individual pump 18 to the unit formed by the sealing jaws 4a and 4b. In the exemplary embodiment shown, every two connection lines 21 are connected to one sealing jaw 4a or 4b.

The two devices 1 make it possible to carry out the following steps of the method in succession, here, preferably in the indicated sequence:

a) moving of at least two oppositely situated sealing jaws 4a, 4b of a sealing station 3 into an open position, wherein the sealing jaws 4a, 4b respectively comprise a sealing surface 5a and 5b and wherein the sealing surfaces 5a, 5b are facing toward each other, b) delivery of a lubricant through at least one lubricant channel 9 of the respective sealing jaw 4a or 4b to the sealing surface 5a or 5b of the sealing jaw 4a or 4b or to the sealing surface 5b or 5a of the oppositely situated sealing jaw 4b or 4a, c) arranging of at least two material layers 6, 7, 8 between the sealing surfaces 5a, 5b of the sealing jaws 4a, 4b, d) moving of the at least two sealing jaws 4a, 4b toward each other into a sealing position, in which the material layers 6, 7, 8 are pressed together by the sealing surfaces 5a, 5b, thereby producing a sealing with a sealed seam 31.

Finally, FIG. 5 shows an example of a finished product packing pouch 2 in the form of a stand-up pouch with spout 27 sealed in by means of the proposed device 1, where the sealed seam 31 is recognizable here, having been produced by the sealing process in the sealing station 3 in order to join the spout 27 to the rest of the pouch 2 by integral bonding.

The invention claimed is:

1. A device for joining together at least two material layers containing plastic to make a sealing connection therebetween, said device comprising:
   at least one sealing station having at least first and second sealing jaws situated opposite each other and movable between an open position and a sealing position; and
   a lubricant delivery device;
   wherein each of the first and second sealing jaws has a sealing surface on an inner side that faces toward the sealing surface of the oppositely situated sealing jaw,
   wherein the at least one sealing station is configured such that in the open position the at least two material layers to be joined together are arrangeable between the first and second sealing jaws and such that in the sealing position the at least two material layers to be joined together are pressable between the first and second sealing jaws,
   wherein at least one of the first and second sealing jaws comprises at least one lubricant channel, and
   wherein the lubricant delivery device is configured to direct a lubricant through the at least one lubricant channel toward the sealing surface of the sealing jaw comprising the at least one lubricant channel and/or toward the sealing surface of the oppositely situated sealing jaw,
   wherein the sealing surface of each of the first and second sealing jaws comprises an upper sealing surface edge and a lower sealing surface edge that is spaced apart from the upper sealing surface edge in a direction of gravity,
   wherein the at least one lubricant channel extends from an entry opening to one exit opening in the sealing surface of the sealing jaw comprising the at least one lubricant channel, or to two or more exit openings in the sealing surface of the sealing jaw comprising the at least one lubricant channel, and
   wherein the one exit opening or the two or more exit openings are spaced farther apart from the lower sealing surface edge than from the upper sealing surface edge.

2. The device according to claim 1, wherein the at least one lubricant channel extends through the at least one of the first and second sealing jaws from at least one of:
   a rear side of the at least one of the first and second sealing jaws facing away from a front side provided with the sealing surface, and
   a side of the at least one of the first and second sealing jaws.

3. The device according to claim 1, wherein a cross section area of the exit opening or the two or more exit openings is less than 5 mm$^2$.

4. The device according to claim 1, wherein the at least one lubricant channel branches one or more times within the at least one of the first and second sealing jaws and leads to two or more exit openings.

5. The device according to claim 1, wherein the at least one of the first and second sealing jaws comprises multiple lubricant channels, each communicating with at least one exit opening.

6. The device according to claim 4, wherein the at least one lubricant channel extends from the entry opening to the two or more exit openings, and wherein the two or more exit openings have a smaller cross section area than the entry opening of the lubricant channel.

7. The device according to claim 4, wherein a distance along the sealing surface between adjacent exit openings is from 5 to 60 mm.

8. The device according to claim 1, wherein the lubricant delivery device comprises at least one lubricant pump and a lubricant reservoir, which is in fluidic connection with the at least one lubricant pump.

9. The device according to claim 8, wherein the lubricant delivery device comprises multiple lubricant pumps, which are driven by a common motor.

10. The device according to claim 8, wherein at least one connection line extends from the at least one lubricant pump to the sealing jaw comprising the at least one lubricant channel.

11. The device according to claim 8, wherein at least one delivery line extends from the lubricant reservoir to the at least one lubricant pump.

12. The device according to claim 10, wherein the at least one connection line is flexible.

13. The device according to claim 1, wherein the first and second sealing jaws are hot sealing jaws or ultrasound sealing jaws.

14. A device for joining together at least two material layers containing plastic to make a sealing connection therebetween, said device comprising:
   at least one sealing station having at least first and second sealing jaws situated opposite each other and movable between an open position and a sealing position; and
   a lubricant delivery device;
   wherein each of the first and second sealing jaws has a sealing surface on an inner side that faces toward the sealing surface of the oppositely situated sealing jaw,
   wherein the at least one sealing station is configured such that in the open position the at least two material layers to be joined together are arrangeable between the first and second sealing jaws and such that in the sealing position the at least two material layers to be joined together are pressable between the first and second sealing jaws,
   wherein at least one of the first and second sealing jaws comprises at least one lubricant channel, and
   wherein the lubricant delivery device is configured to direct a lubricant through the at least one lubricant channel toward the sealing surface of the sealing jaw comprising the at least one lubricant channel and/or toward the sealing surface of the oppositely situated sealing jaw,
   wherein the lubricant delivery device comprises multiple lubricant pumps, which are driven by a common motor, and a lubricant reservoir, which is in fluidic connection with the multiple lubricant pumps.

* * * * *